United States Patent [19]

Billiotte et al.

[11] Patent Number: 4,881,269

[45] Date of Patent: Nov. 14, 1989

[54] AUTOMATIC METHOD OF OPTICALLY SCANNING A TWO-DIMENSIONAL SCENE LINE-BY-LINE AND OF ELECTRONICALLY INSPECTING PATTERNS THEREIN BY "SHAPE-TRACKING"

[75] Inventors: Jean-Marie Billiotte, Noisy Le Grand; Thierry Bouin, Boutigny; Frédéric Basset; Jacques Beauvois, both of Paris, all of France; Didier Primat, Geneva, Switzerland

[73] Assignee: French Limited Company - Centaure Robotique, Montreuil, France

[21] Appl. No.: 296,869

[22] Filed: Jan. 13, 1989

Related U.S. Application Data

[63] Continuation of Ser. No. 185,313, Apr. 20, 1988, abandoned, which is a continuation of Ser. No. 8,246, Jan. 29, 1987, abandoned.

[30] Foreign Application Priority Data

Jul. 29, 1985 [FR] France ................................. 8511535

[51] Int. Cl.$^4$ .............................................. G06K 9/00
[52] U.S. Cl. .......................................... 382/8; 382/30; 382/34
[58] Field of Search .................... 382/8, 10, 25, 26, 30, 382/34, 48; 358/101, 106, 107; 356/388, 392

[56] References Cited

U.S. PATENT DOCUMENTS

| | | | |
|---|---|---|---|
| 4,183,013 | 1/1980 | Agrawala | 382/22 |
| 4,185,298 | 1/1980 | Billet | 358/106 |
| 4,555,798 | 11/1985 | Broadbent | 382/8 |
| 4,635,289 | 1/1987 | Doyle | 382/8 |

Primary Examiner—Leo H. Boudreau
Assistant Examiner—Jose L. Couso
Attorney, Agent, or Firm—Sughrue, Mion, Zinn, Macpeak & Seas

[57] ABSTRACT

A two-dimensional pattern made up of primary and secondary shapes having different levels of contrast, e.g. a printed circuit card, is visually inspected by means of a line-by-line scan, e.g. using a beam of light. A data structure or "file" is built up representative of the current scan line and is compared with a similar file representative of the accumulated scan history so far. The accumulated history file is then updated, the next line is scanned, and the sequence repeats. Allowable changes in shape between scan lines can be coded in the form of multiple-entry digital tables. Non-allowable changes cause alarms to be generated. Allowable changes can easily be altered by downloading a new set of tables, thereby enabling the method to be readily adapted to inspecting different types of object. The method is suitable for implementation by hard-wired logic for high-speed real-time operation.

13 Claims, 6 Drawing Sheets

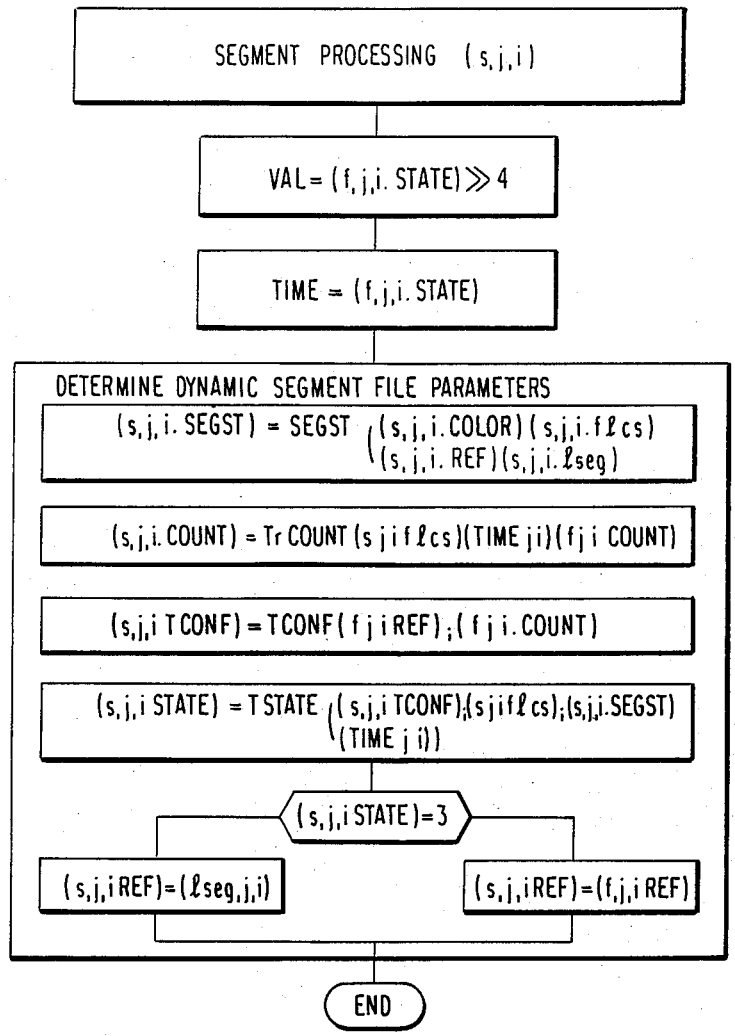
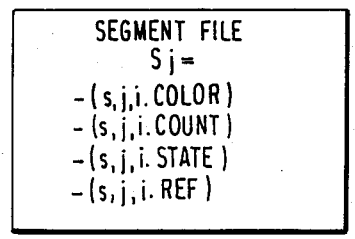
FIG. 7

AUTOMATIC METHOD OF OPTICALLY SCANNING A TWO-DIMENSIONAL SCENE LINE-BY-LINE AND OF ELECTRONICALLY INSPECTING PATTERNS THEREIN BY "SHAPE-TRACKING"

This is a continuation of application Ser. No. 07/185,313, filed 4/20/88 now abandoned, which is a continuation of application Ser. No. 07/008,246 filed 1/29/87 now abandoned.

The present invention relates to automatic quality control and inspection of planar objects or manufactured goods by optical and electronic means. It relates more particularly to an automatic method of scanning and inspecting a two-dimensional scene line-by-line, said scene modulating a scanning beam of electromagnetic waves to at least two different levels.

BACKGROUND OF THE INVENTION

Methods of this type, known as image-processing methods of quality control and inspection, are used in various industries. The increase in the number of manufactured goods, the reduction in sizes of some of their components, and in particular of electronic components, and the cost of personnel employed to inspect, are all tending towards the adoption of inspection techniques based on artificial vision and using:

one or more cameras for making images of the goods to be inspected and for delivering electrical signals representative of said images; and an intelligent electronic system, e.g. microprocessor-based, for processing the electrical signal and for recognizing defects in accordance with a specific algorithm.

There are two main categories of quality control methods based on image analysis:

techniques based on comparison; and absolute techniques.

Techniques of the first type, based on comparison, are the most frequent for inspecting industrial goods having a high density of geometrical figures, e.g. printed circuits or integrated circuits.

Circuitry is used as the example in describing the prior art and also when describing the present invention. However, the problems and principles involved in performing quality control inspection of circuitry are equivalent to those that may arise in many other fields of endeavour.

The general principle of this method of optical and electronic inspection based on comparison is described in published French application No. 2 321 229 in the name of CIT-ALCATEL (equivalent to U.S. Pat. No. 4,185,298 "Process and apparatus for the automatic inspection of patterns"). The method described in this document relates to inspecting printed circuits. It consists in simultaneously scanning two printed circuit cards in identical manner using two linear cameras. One of the printed circuit cards constitutes a master or reference card and is taken to be free from defects. The other card is inspected by comparison with the master card. Both primary analog signals as generated in parallel by the two cameras are converted into two corresponding secondary logic signals by being digitized in binary form relative to a threshold. The secondary logical signals are then compared electronically, and a defect signal is generated when they do not match.

It may be observed that optical and electronic inspection systems of this type which operate by comparison do not keep any record of the way shapes change. Inspection is performed by comparing a line or a zone on a reference circuit with an equivalent line or zone on the circuit being optically inspected. As a result, the design of the system electronics can be very simple. This explains why such systems were initially rather successful.

However, the main defects of this method lie:

in its very high sensitivity to non-uniformities, to local deformatons, or to overall deformations, any of which may have no significant effect on proper operation of the circuit under inspection; and great difficulty in distinguishing between detected defects which are serious and other detected defects which are less serious.

That is why improvements have been sought in this first method of optical inspection by comparison, and such improvements are described in several more recent documents, including those mentioned below.

U.S. Pat. No. 4,056,716, IBM, entitled "Defect inspection of objects such as electronic circuits" describes a variant of the comparison method, which does not consist in comparing the image of a circuit with the image of another circuit scanned under the same conditions of accuracy, but which instead consists in comparing the image of the circuit to be inspected with a low resolution image of the reference circuit. This technique serves to reduce the number of false alarms. However, it emphasizes the detection of small defects and is incapable of sorting defects as a function of their environment.

Another attempt at solving the same problem is described in U.S. Pat. No. 4,148,065, HITACHI, entitled "Method and apparatus for automatically inspecting and correcting masks" which describes another variant on the comparison method. In this method, binarization between the reference image and the image under inspection takes place on a minimum number of bits in such a manner that one bit corresponds to the minimum width of the geometrical figures being inspected. The algorithm concerned consists in looking for all shapes smaller than the minimum thickness of a geometrical figure in each of the two images, and in mutually subtracting the defects detected in the two images. The result of the subtraction is considered as being representative of defects. The document also describes a means for limiting errors due to side-effects by applying a zone thresholding technique.

The defect of this method consists firstly in that it cannot detect defects which are larger than the minimum width of a geometrical figure, and in particular large breaks, and secondly that it cannot distinguish between detected defects which are serious and those which are less serious.

Finally, European published patent application No. 0 004 505, THOMSON-CSF, entitled "A system for inspecting a drawing made on a plane support" describes an improvement to the methods of inspection by comparison in that it seeks to avoid the effects due to inevitable offsets between the element under inspection and the reference element. The general process described consists in inspecting each of the circuits line-by-line, in storing a certain number of lines, and in comparing the configuration of pixels on one line not only with the theoretically equivalent configuration of the other circuit, but also with all other configurations thereof which may be slightly offset from the theoretically identical zone.

Despite their conceptual simplicity, methods of optical and electronic inspection by comparison, and in particular those of the type described in the above-mentioned documents, all suffer from the same fundamental defects:

they are highly sensitive to noise (non-uniform lighting, irregularities in the material, structure of the material . . . );

they are incapable of perceiving the seriousness of a defect and of classifying defects by type;

there are difficulties in implementing them and in adapting them to industrial goods of different types, since inspection always requires a reference circuit to be processed in parallel; and the circuits must be very accurately positioned in order to ensure that their patterns are in register.

That is why a second type of inspection method has been developed which consists in absolute analysis without referring to a reference or master item.

A first variant of this method of absolute inspection is described in U.S. Pat. No. 4,305,097, SIEMENS, entitled "Automated optoelectronic test system for quality control of two-dimensional elements with high geometric figure density". The method consists in analyzing shapes zone-by-zone. I.e., a series of rectangular images are made and these images cover the entire item to be inspected. Each image is digitized, and specific shape processing algorithms are applied thereto, e.g. minimum width rules for conductors and for insulation.

The method described therein is original in that it recommends operation at verious different resolutions depending on the various algorithms which are applied successively. In particular, low resolution images derived from initial high resolution images are used for the application of shape-seeking algorithms, based on comparison with stored reference shapes, thereby detecting special configurations and simple defects. This type of absolute method which operates by analyzing rectangular zones suffers from various defects:

firstly, it must operate on rectangular images, and as a reslt it requires a large amount of memory to be used if good resolution is required;

secondly, it uses algorithms for searching for shapes in a zone, and these algorithms are either not very effective or else they require excessively long processing times and expensive equipment;

its investigation capacities are low; and finally, the equipment requires a separate process per type of defect sought.

Further, the shape-seeking algorithms described are difficult to implement electronically since they do not share any repetitive structures. They must be redesigned, as must the processor cards used therewith, each time a new application is to be implemented having shapes of different topology.

A second variant of this method of absolute inspection is described in a document entitled "Automatic copper pattern inspection system for printed wiring boards" published during "Printed circuit convention III" May 22-25, 1984, in Washington. This document describes a printed circuit inspection system having the following characteristics:

by virtue of an optical system having a large depth of field and using a backscattered laser beam, the copper tracks are inspected in three dimensions on two different levels; and a non-comparative inspection process is provided by coordination between a plurality of sensors disposed in special configurations.

The processing method relies on the fact that if a plurality of sensors are disposed side-by-side in a special configuration to constitute a specially adapted geometrical grid, each type of image defect corresponds to a specific configuration of sensors on the grid. The method then consists in applying specific electronic processing to distinguish various image configurations on the grid of sensors that are characteristic of defects, while the scene is moved relative to the set of sensors.

This absolute method suffers from the following defects:

it requires the simultaneous use of a multitude of sensors, which are not only spaced apart, but which are spaced apart in different directions, thereby giving rise to a system which is very expensive;

further, the image generated by the processed portion must be large in size in order to cover the grid assembly, and such a configuration makes circuit illumination particularly difficult;

also, if a method of specular illumination is used, the object being inspected must be illuminated under a normal incidence, thereby considerably complicating the system;

in addition, the sensor configuration is adapted solely to processing particular shapes, if some other shape is to be processed, the entire sensor configuration must be reconstructed; and finally, the zone-by-zone processing is slow and complex, such that a very long time (about 7.5 minutes) in required, as specified in the document, for inspecting a 290 mm×360 mm circuit with a resolution of 10 microns.

Such slowness of operation is incompatible with the inspection speeds required by modern industry, and in particular by the electronic industry where it is often necessary to inspect thousands of parts daily.

Preferred embodiments of the invention claimed below provide an overall solution for such defects.

Thus, a first aim of the invention is to provide a high-speed method capable of automatically scanning and inspecting the pattern of a two-dimensional scene.

A second aim of the invention is to provide a method of automatically scanning and inspecting a two-dimensional scene with the steps of the method being capable of being implemented very easily using a minimum number of components and a hard-wired electronic processor.

A third aim of the invention is to provide a method of automatically scanning and inspecting a two-dimensional scene without recourse to comparison and capable of inspecting parts having very different patterns without interruption.

A fourth aim of the invention is to provide a method of automatically scanning and inspecting a two-dimensional scene, using a limited amount of memory and a very simple electronic architecture, the method being based on "shape tracking" and enabling the defects encountered to be classified by type.

A fifth aim of the invention is to provide a method of automatically scanning and inspecting a two-dimensional scene and capable of being performed electronically in real time in order to process an image signal at the output from a camera, and in particular at the output from a linear camera operating at a very high acquisition speed.

A sixth aim of the invention is to provide a method of automatically scanning and inspecting a two-dimensional scene, said method being very flexible and adaptable in use, with the method being designed in such a manner that once electronically set up, it is capable of being adapted to a large number of patterns and to a large number of different inspection rules merely by downloading digital tables into the memory of the corresponding processor.

The method of automatically scanning and inspecting the pattern of a two-dimensional scene in accordance with the invention is performed on a line-by-line basis.

Although described below in a highly specific application relating to inspecting printed circuits, the method of the invention is applicable to inspecting any scene having a surface pattern. The sole condition necessary for the method of the invention to be applicable is that the scene must include at least two levels of modulation for a scanning beam of electromagnetic waves. A first level of scene modulation is characteristic of a series of primary shapes which are separate from one another, whereas a second level of modulation relates to a series of secondary shapes occupying the gaps between the various primary shapes.

The method of the invention operates as a function of specific geometrical rules established in advance and stored, in particular, in the form of digital tables, to check both the primary shapes and the secondary shapes of a pattern, to automatically determine those locations in the scene where said rules are infringed, to generate alarms, and to determine the nature of the defects.

SUMMARY OF THE INVENTION

The general principle of the invention consists not in comparing theoretically identical shapes on two objects, one of which constitutes a reference, nor in implementing specific slow and complex algorithms, e.g. shape-seeking algorithms applicatable to successive rectangular zones of the objects, but rather in automatically tracking the way shapes change on a line-by-line basis, by maintaining a history of preceding shapes in digital form as represented by a limited number of parameters, and by updating this history on each scan line. Defects in the pattern are detected by detecting anomalous changes in shape.

In general terms, the method of opticaly scanning and electronically inspecting a scene in accordance with the invention is of the second or absolute type described above. It consists, in conventional manner:

in emitting a beam of electromagnetic waves towards a scene;

in inputting a modulated image of the portion of the scene illuminated by the beam of electromagnetic waves;

in extracting a succession of parallel and adjacent linear images (I,j) from the illuminated portion of the scene, with said images building up to constitute an inspected strip or band (B) of the scene (S);

in successively delivering a primary analog signal (saj) for each processed linear image (I,j) of index (j), with variations in level in said signal being sequentially representative of shape zones intersected by the linear image (I,j); and in digitizing the primary analog signal (saj) of each processed linear image (I,j) in order to transform it, after thresholding, into a secondary binary signal (sbj) in the form of a sequence of n bits, with a first bit value in said secondary binary signal being representative of the linear image (I,j) intersecting a primary shape (Ck) at the location of said bit, and with a second bit value being representative of the linear image intersecting a secondary shape (El).

Further, adjacent bits of the same value or "color" constitute contiguous segments representing the intersection of the processed linear image (I,j) with primary (Ck) and secondary (El) shapes in the scene (S).

In comparison with conventional methods of automatically scanning and inspecting patterns and based on optical and electronic methods of the absolute type performing a line-by-line scan, the method of the invention is remarkable, in particular, by the fact that:

a running electronic shape file (F,j−1), comprising various digital parameters (f,j−1,i.color), (f,j−1,i.count), (F,j−1,i.state) and (f,j−1,i.ref) representative of previously intersected shapes and changes therein in the portio (bj−1) of the strip (B) previously processed line-by-line is successively established and stored prior to processing a new line of index (j).

When processing a line of index (j), the secondary binary signal (sbj) relating to said line (j) is processed and an electronic digital segment table (s,j) is electronically determined for the line (j) relating to the geometrical characteristics of position and color of the segments in the linear image (I,j).

Finally, fixed digital rules referred to as "shape-tracking" rules are used to generate a new electronic shape file (F,j) which is electronically established on the basis of the existing electronic shape file (F,j−1) and of the electronic segment table (s,j) for the current line, thereby providing a new electronic shape file suitable for use with the next line of index (j+1).

BRIEF DESCRIPTION OF THE DRAWINGS

An implementation of the invention is described by way of example with reference to the accompanying drawings, in which:

FIG. 7 is a flowchart compatible with the FIG. 5 variant of the method of the invention and showing a recommended solution for processing the segments of a line;

MORE DETAILED DESCRIPTION

The notation used in the flowcharts is derived from the "C" Programming language which is well known to the person skilled in the art.

Figure 1:
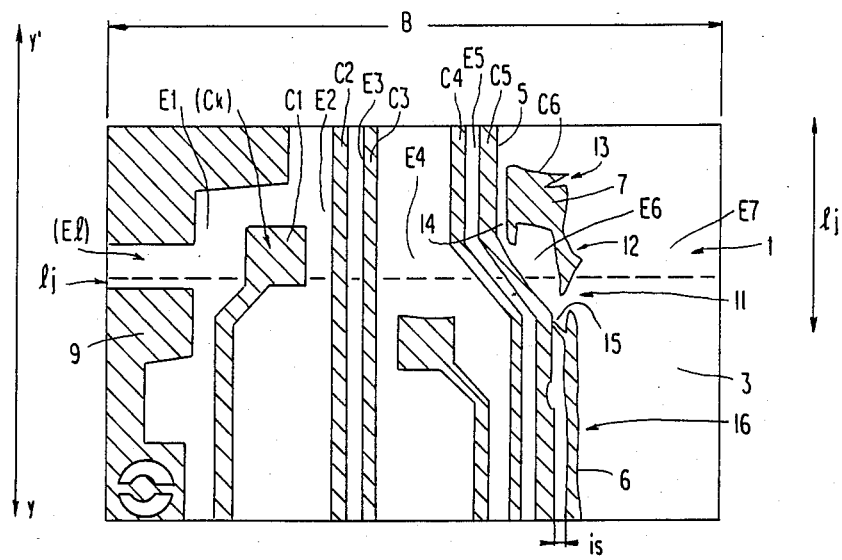
FIG. 1 is a diagram of portion of a scene constituted by a zone of a printed circuit which is being scanned and inspected on a line-by-line basis by the method of the present invention.

FIG. 1 is representative of a common type of plane industrial product produced in large quantities and generally in medium-sized runs.

One of the features of this type of product is that each run has different patterns thereon. The industrial product is a printed circuit card 1. The card is essentially constituted by an insulating support 3 made of epoxy glass material with conductors 5 and 6, pads 7, and ground plane zones 9 all formed thereon by etching.

Printed circuits 1 are intended to be drilled in the middle of each pad 7 in order to receive connection leads from electronic components which are then soldered thereto. With ever increasing component density, the number of pads 7 rises while the minimum insulation gap between conductors 5 and 6 decreases, thereby requiring manufacture to be of ever increasing quality in order to ensure that the final circuit operates properly. As a result quality control requirements are continually becoming more stringent.

FIG. 1 shows the types of defect which are most commonly encountered. These defects include: breaks 11 in conductors, erratic outgrowths 12 from conductors or from pads, nicks 13, insulation defects 14, short-circuits 15, and conductor narrowing 16.

The main inspection method currently employed for detecting such defects in printed circuits is visual inspection. However, this technique is very expensive in personnel costs and is not very reliable.

Some defects can be detected by electrical tests, but these can only be performed after the circuit has been finished, i.e. at a stage when the potential loss in added value is much greater. Further, such electrical testing cannot detect outgrowths 12, regions of narrow insulation 14, or regions of narrow conductor 16, and these defects are of great importance for the lifetime and the reliability of the circuit. The greater the density and the complexity of printed circuits 1, the more important it is to provide adequate quality control inspection thereof.

In order to solve these problems of inspection during manufacture, of detecting various types of pattern defect, and of increasing both speed and reliability of the inspection process, various optical and electronic techniques as described in the introduction have been implemented, but none of them is entirely satisfactory. The problem of automatic inspection described in this example with relation to manufacturing printed circuits is applicable to most of manufacturing industry.

The variant of the method in accordance with the invention as described below with reference to the figures is applied to automatically scanning printed circuit cards 1 by means of an optical and an electronic inspection device 21 of the type shown in FIG. 11. This form of inspection seeks to automatically discover defects (11 to 16) in the circuits 1, and to distinguish between different kinds of defect, while including the advantages of reliability, speed, simplicity, and adaptability, as described above.

Figure 11:
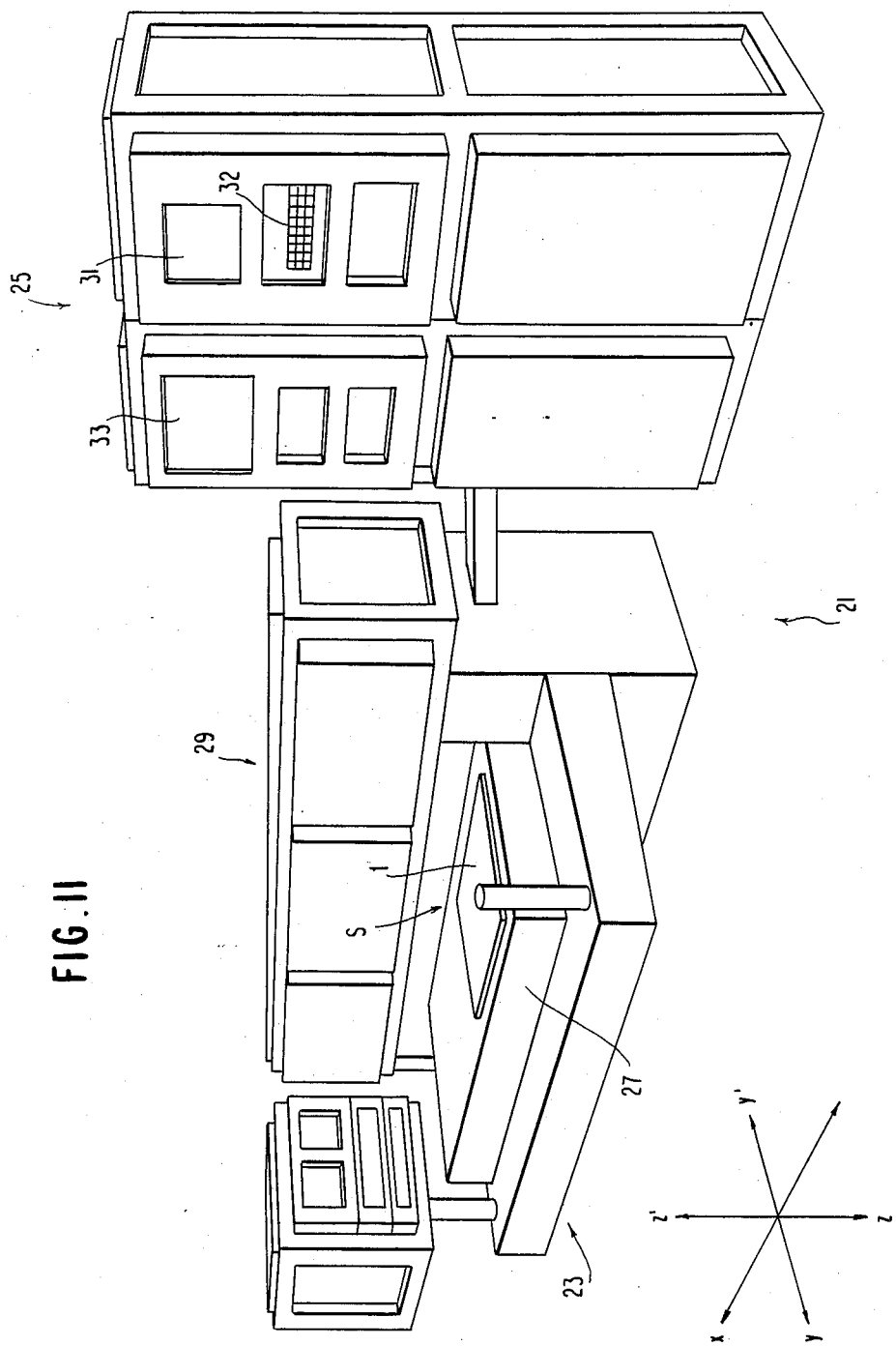
FIG. 11 is a perspective view of an inspection installation used for implementing the scanning and inspection method of the invention.

The inspection device shown in FIG. 11 is essentially constituted by a mechanical portion 23 and by an electronic assembly 25. The mechanical portion 23 displaces a table 27 back-and-forth along a direction y—y' beneath a transverse technical enclosure 29 having an optical system (not shown) for illuminating an item under inspection and for obtaining an image thereof, which optical system is displaceable transversely in a direction x—x'.

This optical device is constituted by the following combination:

a camera including a linear sensor of the CCD type, with the linear sensor axis extending along the transverse direction x—x' and with said camera being focused on the table 27; and a lighting system for providing specular linear illumination of the field seen by the camera, said lighting system being made, in particular, by means of optical fibers. The optical system is movable along the transverse direction x—x' inside the enclosure 29, and as a result the optical system is capable of inspecting an entire scene S of a planar object placed on the table 27, by scanning successive strips of the object. In other words, most objects that require inspection are too wide to be completely scanned by a single pass beneath a linear camera of the type presently available.

The electronic assembly 25 provides the following functions:

acquisition and digitization of the electrical image signals of the scene S;

control and co-ordination of the movements of the mechanical portion 23;

processing of the electrical image signal using the electronic process in accordance with the invention and as described below; and determination of defect alarms.

An alphanumeric screen 31 and a keyboard 32 enable an operator to enter digital parameters into the system characteristic of the inspection rules to be applied to a series of circuits 1 to be inspected. The defects detected are displayed on an inspection screen 33.

The circuit 1 to be inspected is placed on the table 27 of the inspection device 1 and is held in place by a suction system (not shown). The table is moved, under the control of the electronic assembly, so that strips B (FIG. 1) extending along the direction y—y' pass under the optical device. The linear camera of the optical device thus receives a series of parallel lines lj disposed side-by-side and oriented along the direction x—x'. The lighting system emits a beam towards the circuit, thereby illuminating the inspected zone, with said beam being inclined at a specular incidence relative to the camera axis.

The circuit under inspection 1 comprises two zones:

a first zone constituted by primary shapes Ck which are separate from one another and which are constituted by copper portions of the printed circuit, i.e. the conductors 5 and 6, the pads 7, and the ground planes 9; and a second zone constituted by secondary shapes El formed by portions of insulation visible between the primary shapes Ck.

The reflection and backscattering characteristics of copper and of insulation are very different. As a result the illuminating beam is subjected to two different levels of modulation by the circuit 1, with a high level being due to the reflective properties of copper in the primary shapes Ck and with a low level being due to the diffusion properties of epoxy in the secondary shapes El.

Figure 2:
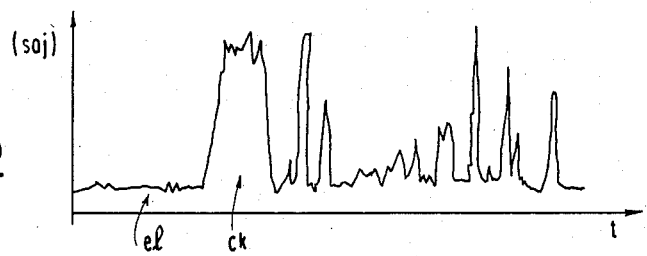
FIG. 2 is a waveform diagram showing the primary analog signal delivered for a line portion during scanning of the printed circuit shown in FIG. 1.

As the table 27 is moved along the axis y—y', the camera receives at each line lj of index (j) a modulated image (I,j) of the illuminated portion of the circuit 1. The camera delivers a primary analog electrical signal saj based on the image (I,j) and the waveform of this signal as a function of time t for line lj is shown in FIG. 2.

The successive images (I,j) received by the camera are parallel and adjacent and build up to constitute the inspected strip B. Naturally, in order to inspect an entire circuit, it is necessary to scan a succession of strips B located side-by-side, with successive strips being obtained by displacing the optical system along the axis x—x'.

For each line lj of index (j) the primary analog signal saj is delivered to an electronic digitizing subassembly situated in the electronic assembly 25. This subassembly digitizes the primary analog signal representative of the line to obtain a secondary binary signal sbj.

The binary signal is in the form of a sequence of n bits where n corresponds to the number of pixels in the linear sensor (generally 1024 or 2048).

For the reasons mentioned above, it can be seen with reference to FIG. 2 that portions el of the analog signal saj corresponding to the secondary shapes El of the circuit 1 are at a low level. Conversely, portions ck corresponding to primary shapes Ck are at a high level. Unfortunately, these variations in signal level are masked to some extent by a considerable degree of signal noise, due to imperfections in the lighting, non-uniformities in the copper or the insulation, or to electronic noise.

Figure 3:
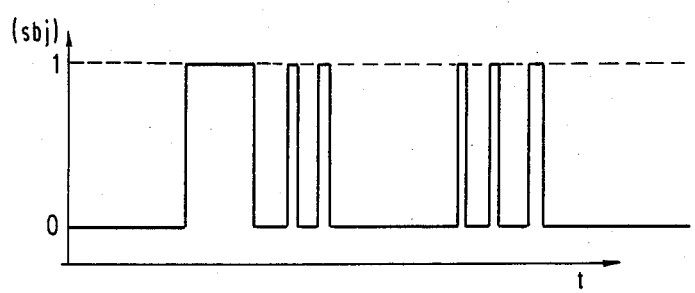
FIG. 3 is a waveform diagram of a secondary binary signal derived from the FIG. 2 primary analog signal after thresholding.

In order to digitize the analog signal saj, use may be made of an adaptive threshold technique which takes account of the noise. One such adaptive thresholding technique is described in published French patent application No. 2 223 701, THOMSON-CSF, entitled "Signal processing device, more particularly applied to detecting variations in the slopes of waveforms". By applying a method of this type, the resulting binary signal sbj representative of the analog signal saj has a waveform as a function of time, t, as shown in FIG. 3.

Figure 4:
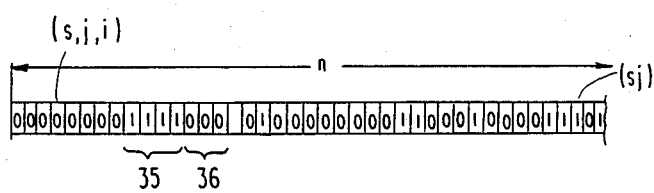
FIG. 4 shows a variant, in accordance with the invention, of the segment table corresponding to the analog signal shown in FIG. 2.

FIG. 4 summarizes the configuration (s,j,i) of the binary signal sbj in the form of a segment table (s,j). The presence of a first bit value (binary 1) is representative of the line lj intersecting a primary shape Ck, whereas the presence of a second bit value (binary 0) is representative of the line lj intersecting a secondary shape El.

In addition, adjacent bits of the same value or "color" constitute segments 35 or 36 whose widths and positions in the table are representative of the linear image (I,j) intersecting primary shapes Ck and secondary shapes El.

The essential stages in the electronic inspection method in accordance with the invention are described with reference to the flowchart of FIG. 5. The principle consists in scanning successive lines lj and in storing a shape file (F,j−1) representative of the changes in the shapes Ck and El previously intersected at line (j−1), and in modifying this shape file (F,j−1) on each line as a function of the changes encountered on said line lj in the positions of the segments in the table (s,j).

In the preferred implementation of the invention, the shape file comprises a plurality of tables:

a shape table: (f,j)=(f,j,i.color) constituted by n digits representing the state of the segment table (s,j−1,i) at the preceding line, (i.e. the "color" of each pixel along the line) so that this table has a configuration of the same type as that shown in FIG. 4;

a shape count table: (f,j,i.count) representative of the "age" of each of the current shapes (C1, C2, C3, C4, C5, C6) and E1, E2, ... E7), i.e. of all the shapes that have continued up to the preceding line;

a shape state table: (f,j,i.state) representative of the type of change taking place in the current shapes Ck and El prior to the current line; and a shape reference table: (f,j,i.ref) substantially representative of the previous width of the current shapes Ck and El.

In the implementation described, each of these four tables of shape parameters is constituted by n variables. Each variable of index (i) corresponds to the i-th pixel of the sensor. This configuration is intended to make the electronic tables more uniform so as to facilitate implementation of the method of the invention by means of hard-wired processors.

Figure 5:
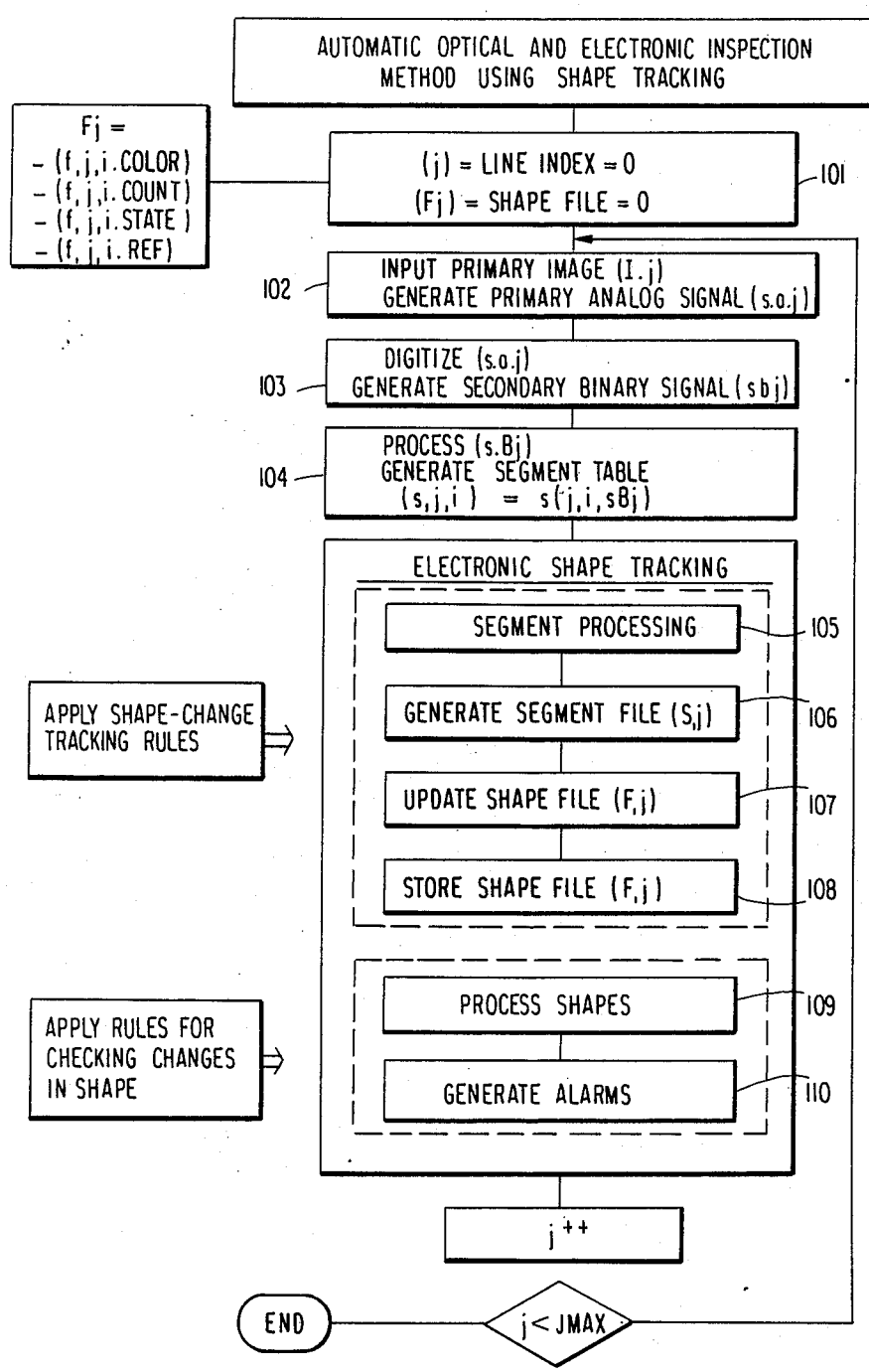
FIG. 5 is a flowchart describing the general principles and overall sequencing of one variant of an electronic method of automatically scanning and inspecting a pattern in accordance with the invention.

The method of the invention, as shown in FIG. 5, begins at step 101 in initializing the line and strip indices (j=0) and in clearing the various elements of the shape file (F,j=0).

The following steps 102, 103 and 104 are already described above with reference to FIGS. 2 to 4. These steps are conventional and consist in inputting a linear image (I,j) of the line lj, in generating the corresponding primary analog signal saj, and in digitizing the primary analog signal saj in order to generate the corresponding secondary binary signal sbj in order to constitute a segment table for the line: (s,j)=(s,j,i)=(s,j,i.color).

One of the particularities of the method in accordance with the invention lies in the electronic processing steps for tracking shapes. These steps come in two categories.

A first category is constituted by segment processing steps (step 105) which consist in:

taking the electronic segment table (s,j,i) of the line lj defining the geometrical characteristics of width, position, and color for the segments in the linear image (i,j), and the electronic shape reference table (f,j,i.ref) from the file (F,j−1) for the preceding line;

in applying fixed numerical rules which are described below with reference to FIG. 7;

in generating an electronic segment file (S,j) (step 106) for subsequently updating a new electronic shape file (F,j) (step 107) for keeping a record of changes in the shapes Ck and El during line lj; and in storing a new shape file (F,j) (step 108).

The new shape file (F,j) is used in the application of the method to the following line, i.e. the line of index (j+1). Thus, the changes in the shapes Ck and El are tracked from one line to the next.

At the same time as the segments are processed, shape processing steps (step 109) are performed, as described in greater detail below, in order to generate alarms (alarms,j,i) indicative of defects in changes in shapes on a line, by application of digital rules for checking on changes in shapes.

Figure 6:
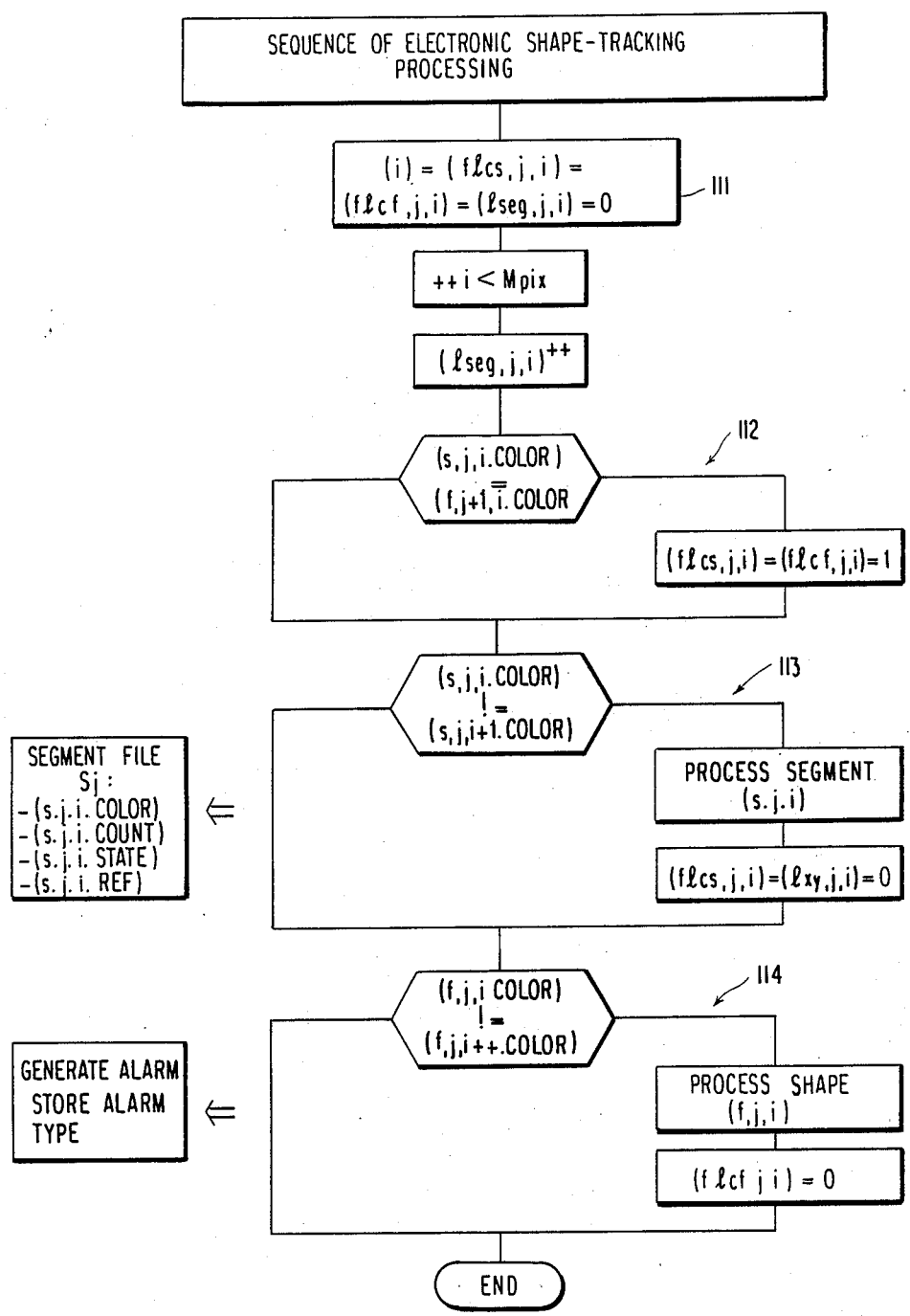
FIG. 6 is a flowchart compatible with the FIG. 5 flowchart and showing the sequencing of the shape-tracking electronic processing stages for each line.

The sequencing between the segment processing operations and the shape processing operations is described with reference to FIG. 6. It consists in establishing the following items in the current electronic segment table (s,j)=(s,j,i) on the basis of the information contained in the electronic shape table (f,j−1) for the previous line (i.e. the line of index (j−1) where (f,j−1)=(f,j−1,i.color)):

a list of the shapes (f,j−1,i) which are extended on line lj by a segment (s,j,i) overlapping old shape, i.e. the list of shapes (s,j−1,i) which continue on the line of index (j); and a list of the shapes (s,j−1,i) which are interrupted on line lj.

A digital "shape confirmation (end of shape)" parameter (flcf,j,i) is associated with this continuity criterion for the shapes (f,j,i) being satisfied.

Figure 8:
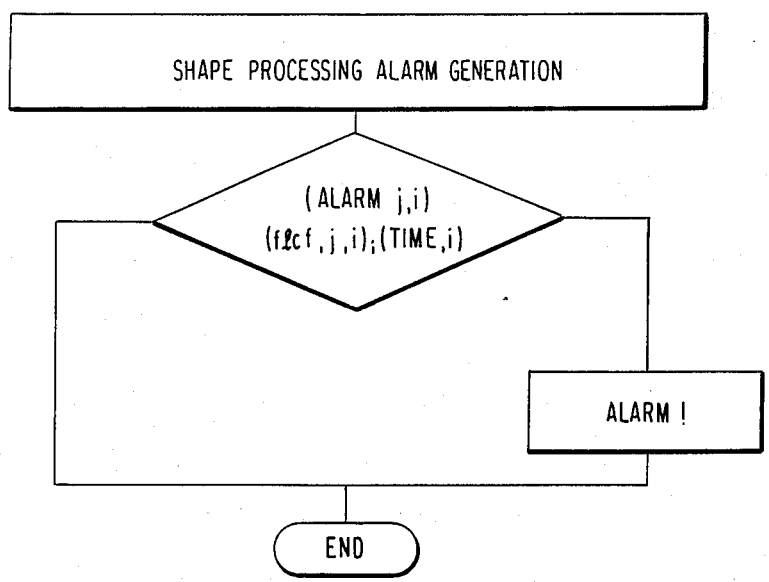
FIG. 8 is a flowchart compatible with the variant of the method shown in FIG. 5 and showing a recommended solution for processing shapes on a line, and ending up with alarms being generated, where necessary.

The state of the shape confirmation digital parameter (flcf,j,i) is used, as can be seen in FIG. 8, when applying the digital rules for checking changes in shapes and possibly leading to the generation of alarms for the line lj.

Likewise, the following items are established from the digital information contained in the electronic shape table (f,j−1,i) and in the electronic segment table (s,j,i):

a list of the segments (s,j,i) which, on the line of index (j) extend a shape (f,j−1,i) of the shape file (F,j−i), i.e. a list of segments (s,j,i) which at least partially overlap one of the "old" shapes (s,j−1,i); and a list of segments (s,j,i) which do not overlap an "old shape (s,j−1,i), i.e. segments which belong to new shapes that are just beginning.

When this criterion for a shape (f,j−1,i) being overlapped by a segment (s,j,i) is true, a digital segment confirmation (beginning of shape) parameter (flcs,j,i) is associated therewith and is stored.

The state of the segment confirmation digital parameter (flcs,j,i) is used, as can be seen from FIG. 7, in the electronic application of the rules for tracking changes in shape and giving rise on each line lj to the generation of a new shape file (F,j).

Also, a width parameter (lseg,j,i) is calculated for each segment equal to the number of consecutive pixels in the segment, i.e. to its width.

The electronic shape-tracking processing, described with reference to FIG. 6, begins with an initializing step 111 which consists in zeroing the values of the parameters of index (i)=(pixel index), in zeroing the shape confirmation and the segment confirmation parameters (flcf) and (flcs), and in zeroing the width parameter (lseg). Then the line is analyzed in increasing pixel order to see whether the above-described rules concerning continuity and overlap are satisfied.

Step 112 consists in verifying whether the color of the i-th pixel of segment (s,j,i) is identical to the color of the corresponding pixel in the shape table (f,j−1,i), and thus in verifying both overlap and continuity of the shapes and the segments.

Step 113 determines the ends of segments (s,j,i) by comparing the color of the i-th pixel with the color of the next pixel. Segment processing is then performed using the method described with reference to FIG. 7.

Step 114 detects the end of a shape (f,j−1,i) by comparing the color of a pixel (f,j−1,i) in the shape table (f,j−1) with the next pixel. Shape processing is then performed using the method described with reference to FIG. 8.

In the preferred implementation of the invention as described with reference to the drawings, the segment files (S,j) and the shape files (F,j) have the same form and correspond to each other. In other words, the tables of shape parameters in the stored shape filed which is updated on each line lj, (F,j)=

(f,j,i.color);
(f,j,i.count);
(f,j,i.state); and
(f,j,i.ref)

correspond to a corresponding series of segment parameter tables in a segment file for the line (l,j−1), with (S,j−1)=

(s,j−1,i.color);
(s,j−1,i.count);
(s,j−1,i.state); and
(s,j−1,i.ref).

The dynamic parameter file of the segment file (S,j) of line lj is updated on the basis of:

firstly the segment table (s,j,i) which is directly determined from the binary signal (sbj); and secondly the parameters of the shape file (F,j−1).

A variant implementation of the shape-tracking rules for electronically calculating the segment file is described with reference to FIG. 7.

In this variant which is specifically applicable to inspecting printed circuits, the state of the shapes is a parameter corresponding to the type of the shape and to changes therein, and this parameter may make several significant values as listed in the following table which is given by way of example and which is specifically adapted to inspecting printed circuits. These values depend from reference parameters entered at the keyboard by an operator.

| TABLE OF SHAPE STATES | |
|---|---|
| STATE | MEANING |
| 0 | Conductor too small |
| 1 | Conductor narrowing |
| 2 | Conductor constant |
| 3 | Conductor widening |
| 4 | Pad too small |
| 5 | Pad |
| 6 | Large shape or ground plane |
| 7 | Insulation too small |
| 8 | Insulation |
| 9 | Clearance |
| 10 | Large insulation |

It can be seen from this table that the eleven possible digital values of the parameter (f,j,i.state) can be used to simultaneously define the topology, the origin, and changes in current shapes.

In accordance with the invention, the inspection method is intended to be capable of being hard-wired. The term hard-wired designates a microprogrammed circuit wherein the instructions corresponding to the operations performed are implemented. The shape-tracking rules consist in successively determining the following tables of dynamic segment parameters from the segment table (s,j,i.color) and from the shape file (F,j−1):

(s,j,i.segst)—representative of the state of the segments;

(s,j,i.count)—representative of the history of the shape;

(s,j,i.tconf)—representative of shape continuity; and (s,j,i.state)—representative of change rules.

Each parameter is calculated using a digital table having a plurality of entries, the structure of the table being accessible from the processor card. The values and the forms of the various tables depend on the current inspection application and on the type of shape-tracking rules chosen. However, they are very easily and very quickly modifiable without changing the structure of the processor, for example by downloading into read/write memory (RAM).

As an example of such digital tables having a plurality of entries defining the shape-tracking rules, the dynamic segment count parameter (s,j,i.count) may, in the present example relating to printed circuits, be given by a three-entry table depending on the following parameters: (s,j,i.flcs), Val (count authorization), (f,j,i.count).

A preferred variant of the invention for inspecting printed circuits is given below.

| TABLE FOR DETERMINING THE PARAMETER (s,j,i.count) | | | | |
|---|---|---|---|---|
| f,j,i.count | | 0 | 13,14 | 29 |
| val: 0 | flcs = 0 | 0 | 0 | |
| | flcs = 1 | 0 | 0 | |
| val: 1 | flcs = 0 | 0 | 0 | |
| | flcs = 1 | 0 | 14,15 | 0 |

The other segment parameters proposed in FIG. 7 and mentioned above may be automatically determined using a succession of digital tables of the above type, with the number of entries to each table depending on the number of dependent variables used within the shape table (f,j), or the segment file (S,j), or on previously calculated intermediate parameters.

Figure 10:
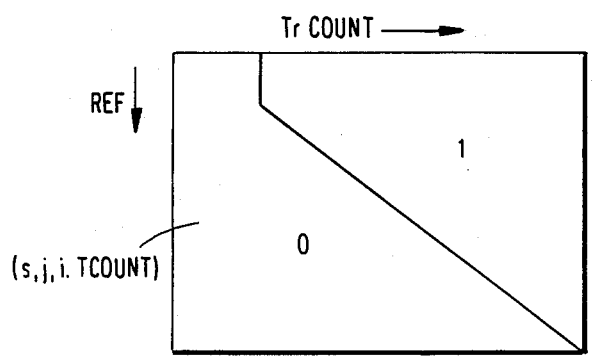
FIG. 10 is a double-entry table for describing the shape-tracking rules in accordance with the invention as applied to updating the segment count parameters (s,j,i.t count)

In particular, automatic determination of the confirmation parameter (s,j,i.tconf), may be performed from a table of the type shown in FIG. 10. This is a two-entry table with the two entries corresponding to two selected variables (trcount) and (ref). This table associates the selected pair of entry variable values with a binary (0 or 1) confirmation state.

Thus, for each application of the method in accordance with the invention to automatic inspection, and for each type of product having a particular pattern, it is necessary to establish:
 a series of tables of the above type; and
 a series of constants situated in the tables to define rules for tracking changes in shapes.

The sizes of these tables are determined by the number of variables used (and also the maximum capacity of the hard-wired circuitry), and they are filled with digital values which are determined by topological analysis and by experiment.

After the electronic rules for tracking changes in shape have been applied to line lj, as shown in the implementation described with reference to FIG. 7, a segment file (S,j) is obtained which holds information relating to the changes on line of index (j) in the various shape parameters.

Figure 9:
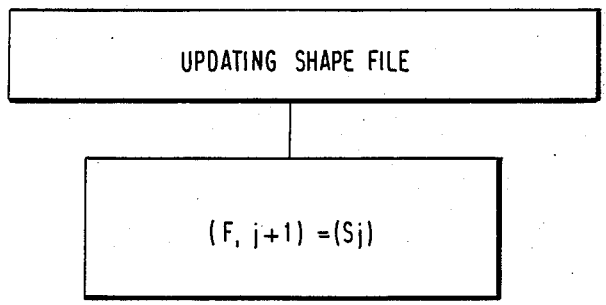
FIG. 9 is a flowchart compatible with the FIG. 5 variant of the method of the invention, and describing a recommended solution for applying shape-tracking rules.

By applying the process described with reference to FIG. 9, i.e. by electronically erasing the old shape file (F,j−1) and replacing it by the segment file, i.e. by putting (F,j)=(S,j), it is possible to continue the shape-tracking method after taking account of the changes that occurred in line lj.

In this variant, each time a line lj is being electronically processed, a segment file (S,j) is constructed which becomes the shape file (F,j) for use when processing the following line of index (j+1).

It is recommended that the shape file (F,j) include the following four shape-change tables, independently or preferably in combination:

an electronic shape table (f,j,i.color) representative in digital form of the intersection conditions between the shapes Ck and El and the linear images; this shape table may be constituted simply by the binary signal sbj stored in sequential form;

an electronic shape state table (f,j,i.state) representative in digital form of the topology of each shape (f,j,i), of its origin, and of changes therein up to the line of index (j); the parameters in the shape table preferably take the values described in the above shape state table;

an electronic shape reference table (f,j,i.ref) representative in digital form of the widths of the shapes prior to their intersections with the current line lj; and an electronic shape count table (f,j,i.count) representative of the number of lines by which the shapes (f,j,i) have been intersected prior to the current line lj.

In the preferred variant of FIG. 7, the shape reference parameter (f,j+1,i.ref) is deduced from the segment reference parameter (s,j,i.lseg) of the preceding line. The value is determined as a function of an intermediate reference maintaining parameter dependent on the dynamic parameters concerning the segment state (s,j,i.segst) and the shape state.

(segst) is an intermediate dynamic segment parameter giving the intrinsic state of the segment as a function of rules conerning minimum and maximum width, and as a function of the current shape reference and of the fixed reference width parameters entered by the operator.

For a printed circuit, it is recommended that (segst) should have the following output values:

| TABLE OF VALUES FOR THE PARAMETER (SEGST) | |
|---|---|
| STATE | MEANING |
| 1 | Primary shape too small |
| 2 | Primary shape narrowing |
| 3 | Primary shape unchanged |
| 4 | Primary shape too wide |
| 5 | Primary shape widening |
| 6 | Secondary shape too small |
| 7 | Secondary shape normal |

When the parameter (segst) takes the value state=3, i.e. when the shape is of substantially constant width, (s,j,i.ref) is given the same value as (s,j−1,i.ref) and this value is maintained so that the reference of the shape remains constant. In contrast, when the parameter (segst) has a value other than 3, the reference is given the value of the local width of the segment (lseg).

Thus, as can be seen with reference to FIG. 7, each of the shape parameters in the shape file (F,j+1) is equal to the parameters of the segment file (S,j) which are calculated on each line on the basis of the shape file (F,j) and of the segment table (s,j,i.color).

Tracking changes in the parameters of the shape file (F,j) and in particular the line-to-line definition of the shape state parameters makes it possible to generate alarms in the event of abnormal changes in shape, as defined by digital rules for checking changes in shape. These geometric rules for checking changes in primary shapes Ck and secondary shapes El are modelled by digital criteria applied on each line lj to the shape file (F,j−1) and to the segment table (s,j).

In particular, the shape change rules described in FIG. 7 make it possible to track any shape whose state is changing from a normal state towards an alarming state, for example state 2 changing towards state 1.

An electronic function makes it possible to generate an alarm either as a function of changes in a shape or else as a function of a shape disappearing, given the previous change in state of the shape. A digital function of this kind can thus be performed using a double entry table associated with values of the shape confirmation parameter (flcf)=(0) and the number of shape states necessary for tracking changes in the shapes.

When an alarm is detected, the method in accordance with the invention can be used to specify:

the position of the alarm in terms of the line index (j) and the pixel index (i); and the type of the defect as defined by the corresponding shape state (f,j,i.state).

It may be observed that the repetitive, line-by-line structure of the shape-tracking method in accordance with the invention makes it possible to provide simple and effective hard-wiring.

The shape-tracking rules and the rules for inspecting shapes can easily be loaded into memory in the form of tables, and they can readily be modified. Finally, implementation of the method by the inventors in hard-wired form has shown that a simple electronic structure is capable of reaching a very high overall processing speed when scanning and inspecting changes of shape, for example a speed can be achieved which corresponds to acquisition using a linear camera operating at 10 MHz.

The invention has been described above by way of example, but it will be readily apparent that numerous variations are possible while still remaining within the scope of the claims.

We claim:

1. A method of automatically scanning and inspecting the pattern of a two-dimensional scene line-by-line, without recourse to a reference scene, said pattern including at least two different modulation levels for a scanning electromagnetic wave beam, said levels including a first modulation level representative of first scene zone which is constituted by a series of primary shapes which are separated from one another, and a second level of modulation representative of a second scene zone which is constituted by a series of secondary shape situated between said primary shapes, the method comprising the following steps:

emitting the scanning electromagnetic wave beam towards the scene;

inputting a modulated image of the portion of the scene illuminated by the beam of electromagnetic wages;

extracting a succession of parallel and adjacent linear images from the illuminated portion of the scene;

building up said linear images so as to constitute an inspected strip of the scene;

successively delivering for each linear image (I,j) processed of index (j) a primary analog signal (saj) in which variations in analog signal level are sequentially representative of the scene zones intersected by the linear image (I,j);

digitizing the primary analog signal (saj) in each processed linear image (I,j) in order to transform it by a thresholding technique into a secondary binary signal (sbj) having n bits organized sequentially, with a first bits value in a said secondary binary signal being representative of the processed linear image (I,j) intersecting a primary shape at the first bit location, and with a second bit value being representative of the processed linear image (I,j) intersecting a secondary shape at the second bit location, in addition, adjacent bits of the same value or "color" constituting contiguous segments (s,i,j) representative of the linear image (I,j) intersecting primary shapes and secondary shapes in the scene;

the method including the improvement of the following steps in combination:

prior to processing a new line lj of index (j), establishing and storing an electronic shape-change file (F,j−1) representative of previously intersected primary shapes and secondary shapes, and also representative of changes in said shapes in the portion of the scanned strip of the scene which has already been processed line-by-line;

prior to processing each new line lj of index (j), establishing and storing series of digital shape count parameters (f,j−1,i.count) within the electronic shape-change file (F,j−1), each shape having such a parameter associated therewith and each shape count parameter being representative of the number of lines during which the shape (f,j−1,i) has been intersected without interruption by successive preceding linear images;

while processing the line lj, processing the secondary binary signal (sbj) relating to said line lj to electronically determine an electronic segment table (s,j)=(s,i,j) for said line and relating to the geometric characteristics of position and color and of the segments (s,j,i) in the linear image (I,j);

using both the electronic shape file (F,j−1) and the electronic segment table (s,j) to establish a new electronic shape file (F,j) for use in conjunction with the following line of index (j+1), with said new electronic shape file being established electronically in accordance with fixed digital rules for tracking changes in shapes; and after processing each linear image (I,j), using the old electronic shape-change file (F,j−1) and the segment table (s,j) for the current line of index (j) to update new count parameters (f,j,i.count) for the new shapes (f,j,i) within the new electronic shape-change file (F,j) for use in processing the following line of index (j+1).

2. An automatic method according to claim 1, further comprising the steps of:

prior to processing each new line lj of index (j), establishing and storing an electronic shape table (f,j−1) within the electronic shape-change file (F,j−1), which table is substantially representative in digital form of the conditions under which the primary and secondary shapes have intersected the linear images prior to the line of index (j); and after processing each linear image (I,j) corresponding to the line of index (j), updating a new shape table (f,j) for the shape-change file (F,j) for use in processing the following line of index (j+1), with the updating being based on the shape-change file (F,j−1) and the segment table (s,j) of the line of index (j).

3. An automatic method according to claim 1, further comprising the steps of:

prior to processing each new line lj of index (j), establishing and storing a series of shape state digital parameters (f,j−1,i. state) within the electronic shape-change file (F,j−1), each shape having such a parameter associated therewith and each shape state parameter being representative of the topology of the shape (f,j−1,i), of its origin, and of changes therein which have occurred in the previously inspected portion (b,j−1) of the strip under inspection; and after processing each linear image (I,j), using the old electronic shape file (F,j−1) and the segment table (s,j) for the current line to update new state parameters (f,j,i.state) for new shapes (f,j,i) within the new electronic shape-change file (F,j) for use in processing the following line of index (j+1).

4. An automatic method according to claim 1, further comprising the following steps:

prior to processing each new line lj of index (j), establishing and storing a series of digital shape reference parameters (f,j−1,i.ref) within the electronic shape-change file (F,j−1), each shape having such a parameter associated therewith and each shape reference parameter being representative of the width of the shape (f,j−1,i) prior to its intersection with the line of index (j); and after processing each linear image (I,j), using the old electronic shape-change file (F,j−1) and the segment table (s,j) for the current line of index (j) to update new reference parameters (f,j,i.ref) for the new shapes (f,j,i) within the new electronic shape-change file (F,j) for use in processing the following line of index (j+1).

5. An automatic method according to claim 1, wherein said primary shapes and secondary shapes which are subject to specific geometric rules with respect to checking changes in said shapes, and wherein:

said geometric rules for checking changes in the primary shapes and in the secondary shapes of the scene are modelled by constant digital criteria for checking changes in shape, said criteria relating, on each line of index (j) to digital relationships between the old shape-change file (F,j−1) and the current segment table (s,j);

for each line of index (j) and for each shape (f,j,i) on the line, an electronic check is performed to verify that the digital criteria for checking changes in shape are satisfied between the parameters of the shape-change file (F,j−1) and the parameters of the segment table (s,j); and for each line of index (j) and for all of the shapes (s,j,i) on the line for which said shape change checking rules are not satisfied, an inspection alarm is generated representative of an assumed defect in the shape (s,j,i) on the line of index (j).

6. An automatic method according to claim 5, wherein for each line of index (j) processed:

the digital information contained in the electronic segment table for the current line (s,j) and in the electronic segment table for the previous line (s,j−1) and stored in the form of an electronic shape table (f,j-1) within the electronic shape-change file (F,j−1), is used to establish both a list of the shapes (f,j−1,i) which continue to exist on the current line of index (j) by virtue of an overlapping segment (s,j,i) in the current line, and a list of shapes (f,j−1,i) which do not continue to exist on the current line;

a "shape-confirmation" digital paramer (flcf,j,i) is associated with each shape (f,j,i) on the current line to indicate whether the associated shape continues to exist or ceases to exit, and said parameter is stored; and the stored values of the digital shape-confirmation parameters (flcf,j,i) are used on the current line when electronically checking that said rules for checking changes in shape are satisfied by each shape (f,j,i).

7. An automatic method according to claim 2, wherein for each line of index (j) processed:

the digital information contained in the electronic segment table for the current line (s,j) and in the electronic segment table for the previous line (s,j−1) and stored in the form of an electronic shape table (f,j−1) within the electronic shape-change file (F,j−1), is used to establish both a list of the segments (s,j,i) on the current line of index (j) which extend a shape (f,j−1,i) of the shape file (F,j−1), i.e. a list of the current segments (s,j,i) which at least partially overlap one of the old shapes (f,j1,i), and a list of the current segments (s,j,i) which do not overlap any of the old shapes (f,j−1,i), i.e. those segments which correspond to the beginnings of new shapes;

a "segment-confirmation" digital parameter (flcs,j,i) is associated with each occasion that an old shape (f,j−1,i) is overlapped by a current segment (s,j,i), and said parameter is stored; and the stored values of the digital segment-confirmation parameters (flcs,j,i) for all of the segments (s,j,i) are used on the current line when electronically applying the electronic shape-tracking rules that generate a new shape-change file (F,j) for use in processing the next line of index (j+1).

8. An automatic method according to claim 1, further comprising the following steps:

for each line of index (j), establishing and storing a series of segment state digital parameters (s,j,i,-segst) on the basis of the digital information contained in the electronic segment table (s,j,i), and optionally in the various shape reference digital parameters (f,j−1,i.ref) contained in the shape-change file (F,j−1), each segment (s,j,i) in the line of index (j) being associated with such a segment state parameter, and each segment state parameter being representative of the local dimensional characteristics of the segment being in conformity stored references; and after processing each line of index (j), using said segment state digital parameters (s,j,i.segst) first to participate in the electronic application, for said line of index (j), of the rules for checking chanes in shape which may lead to the general of inspection alarms, and second to update new items in the old shape-change file (F,j−1) to obtain the new electronic shape-change file (F,j) for use with the next line of index (j+1), and in particular to update the shape references (f,j,i.ref) for the following line.

9. An automatic method according to claim 2, wherein the electronic shape-change file (F,j−1) includes an electronic shape table (f,j−1) which is identical in structure to the n digit electronic segment table (s,j) for the current line of index (j), said structure comprising the secondary binary version of the linear image over n pixels for the line of corresponding index (j) or (j−1) as the case may be.

10. An automatic method according to claim 9, further comprising the steps of:

after processing each of index (j), modifying the shape table by giving a structure (f,j,i) which is identical to the structure of the segment table (s,j,i) of the line of index (j) in preparation for processing the following line of index (j+1).

11. An automatic method according to claim 1, further comprising the step of, prior to processing each new line of index (j), establishing an electronic shape-change file (F,j−1) having structure constituted by various parameter tables, said tables including:

a shape table (f,j−1,i) comprising a succession of color parameters (f,j−1,i.color) representative of intersection with various primary and secondary shapes;

a shape count table (f,j−1,i.count) with each shape count parameter being representative of the "age" of the corresponding tracked shape;

a shape state table (f,j−1,i.state) with each shape state paramer being representative of the type of change which has occurred to the state of the shape; and a shape reference table (f,j−1,i.ref) with each shape reference parameter being representative of the width of the corresponding shape;

while processing each line of index (j), establishing a segment file (S,j) using digital shape change rules and on the basis of the shape-change file (F,j−1) and information concerning the intersections of the current line of index (j) with primary and secondary shapes as contained in the secondary binary signal (sbj), said segment file (S,j) having an identical table structure to the shape-change file (F,j−1) and comprising a series of dynamic segment parameters, and in particular:

a segment table (s,j,i)=(s,j,i.color);
a segment count table (s,j,i.count);
a segment state table (s,j,i.state); and
a segment reference table (s,j,i.ref);

with the values of the shape-change file (F,j) for use in processing the following line of index (j+1) being the same as the segment file (S,j) for the current line of index (j).

12. A method according to claim 1, wherein:

digital rules concerning changes in shape are fixed and constituted by linear relationships between various parameters in the shape-change file (F,j−1) and the segment file (S,j) of the current line of index (j); and these relationshps are established in the form of a series of digital shape change table (Tm) having (en) entries;

said digital shape change tables being stored; and each table (Tm) defining, as a function of the (en) entry parameters thereto (pm,i,j), the value of an output parameter (sm,i,j) for the following shape-change file (F,j) for use when processing the following line.

13. A method according to claim 1, wherein said two-dimensional scene if of an electronic circuit, said electronic circuit including:

exposure masks;
etching layers;
etched layers; and
electronic circuit boards;

all of said masks, layers, and circuit boards selectively including conductor material, insulator material, pads, and ground planes, in which the primary shapes comprise portions of said conductor material, said pads, and said ground planes, and in which the secondary shapes comprise portions of said insulator material.

* * * * *